Patented Oct. 13, 1953

2,655,489

UNITED STATES PATENT OFFICE 2,655,489

COATING COMPOSITIONS COMPRISING POLYETHYLENE AND ALKYL POLYSILOXANE AND METHOD OF MAKING SAME

William Dent Lawson, Springfield, Pa., assignor to E. I. du Pont de Nemours and Company, Wilmington, Del., a corporation of Delaware No Drawing. Application September 19, 1951, Serial No. 247,363

8 Claims. (Cl. 260—29.1)

This invention relates to liquid coating compositions, more particularly to glossy organic enamels and lacquers having a high degree of abrasion resistance, and still more particularly to a method of making such compositions.

Organic coating compositions that are unusually resistant to abrasion are disclosed in U. S. Patent 2,518,462, which issued August 15, 1950, to Gowing et al. These products contain a small amount of a selected polymer of ethylene. While most of the physical and chemical properties of these coating compositions (e. g. hardness, toughness, durability, color retention, etc.) are comparable to the corresponding compositions containing no polymerized ethylene, it has been recognized that the addition of polymerized ethylene which increases the abrasion resistance, results in a reduction of the gloss. For instance a certain white baking type enamel yields a coating having a gloss of 68, and a duplicate enamel containing about 3.5% polymerized ethylene, added as described in U. S. Patent 2,518,462, has a gloss of only 14.1, based on an arbitrary scale in which a higher value indicates higher gloss. In the case of other enamels or lacquers having a normally lower gloss, the gloss-depressing action of the polymerized ethylene is not proportionately so great.

The principal object of this invention is to overcome the reduction of gloss resulting from the incorporation of polymerized ethylene in enamels and lacquers.

Another object is to provide a manufacturing process whereby polymerized ethylene can be incorporated in enamels and lacquers without materially reducing their gloss.

A further object is to provide abrasion resistant enamels and lacquers containing polymerized ethylene having substantially improved gloss.

These and other important objects are accomplished by preparing a gel comprising a liquid polysiloxane and polymerized ethylene, grinding the gel in the presence of those constituents of an enamel or lacquer which require grinding. Preferably a liquid methyl polysiloxane (i. e. polydimethyl siloxane or "methyl silicone") is used in carrying out the invention. Such polysiloxanes are commonly referred to as "silicone oils" and are represented by the following structural formula:

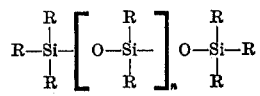

in which the various "R's" represent monovalent alkyl hydrocarbon radicals and "$n$" is a whole number greater than 1. The silicone oil preferred in this invention is one in which substantially all of the "R's" represent methyl groups.

The preferred silicone oil has a viscosity between about 100 and about 1000 centistokes at 25° C.

The preferred polymerized ethylene for use in this invention is a solid at room temperature, has a structural formula characterized by recurrent connected —$CH_2$— groups, and shows a crystalline structure by X-ray diffraction and has a density in the range of 0.922 and 0.988 with a molecular weight of the order of 10,000 as determined by Staudinger's viscosity method. These polymers may be prepared in general as outlined in Fawcett U. S. Patent 2,153,553 and Krase U. S. Patent 2,388,160. Other ethylene polymers may be used, particularly those obtained by polymerizing ethylene in the presence of modifying agents such as dioxolane, cyclohexane, methyl propionate, propionic anhydride, diethyl ether, methanol, and hydrogen. The preparation of such modified ethylene polymers is described in Loder et al. U. S. Patent 2,304,862; Peterson et al. U. S. Patent 2,395,292; Roland et al. U. S. Patent 2,433,015; Hanford et al. U. S. Patent 2,440,800; and Roland et al. U. S. Patent 2,479,082.

The specific process step in which the silicone oil and ethylene polymer are incorporated with other ingredients of the enamel or lacquer is critical and constitutes an essential part of this invention. It has been found that the maximum improvement in gloss is produced when the silicone and polymerized ethylene are first compounded into a gel. This gel is then ground or dispersed with pigment, organic binder (film former), and organic solvent during the grinding or dispersion step, which may be carried out in a ball or pebble mill. The resulting milled material, referred to as a mill base, is usually converted to the final enamel or lacquer by the addition of further ingredients, such as, e. g. organic binder, solvent, plasticizers, driers and inhibitors. Experiments have shown that if the polymerized ethylene and silicone oil are added separately, or together at a later stage in the process, the same improvement does not result. The gel is made by heating the ethylene polymer, silicone oil, and a solvent at a temperature of the order of 210° F. until a clear solution is formed and cooling to room temperature, whereupon a friable gel is formed.

The following specific examples are given by way of illustration and not limitation. Throughout the specification and claims the parts and percentages are on a weight basis.

Examples 1–7 are fundamentally the same enamel except for the presence or absence of silicone oil and/or polymerized ethylene. The concentration of silicone oil and/or polymerized ethylene, when present, remains constant throughout Examples 1–7 for ease in comparing results. As will be seen from the results, the series shows that the improvements of this invention are produced only by one method of incorporating the silicone oil and polymerized ethylene, i. e. by grinding a preformed gel, which comprises these two constituents, in the presence of pigment and organic film former.

EXAMPLE 1

A silicone oil-polymerized ethylene gel was made by heating the following constituents at about 210° F. until a clear solution had formed, straining to remove foreign matter, and cooling to room temperature:

*Silicone oil-polymerized ethylene gel*

| | Parts |
|---|---|
| Polymerized ethylene (dry powder) | 30 |
| Silicone oil solution | 12 |
| Xylene | 58 |
| | 100 |

The polymerized ethylene was of the preferred type previously described.

The silicone oil solution was a 1% solution by weight of a polydimethyl siloxane in xylene. The polydimethyl siloxane was identified as DC-200 silicone oil (1000 centistokes), a product of the Dow-Corning Corporation. A companion product, DC-200 silicone oil (100 centistokes), may be substituted on the basis of an equal weight of silicone oil for the higher viscosity material. Examples of other silicone oils are those marketed by General Electric Company.

The enamel was made in two steps; first, the ball milling or grinding of the pigment with a portion of the film former in the presence of the silicone oil-polymerized ethylene gel to produce a mill base, and second, the conversion of this mill base to an enamel by the addition of further film former and solvent in a simple mixing operation.

*Mill base A*

| | Parts |
|---|---|
| Alkyd resin #1 | 2.8 |
| Urea-formaldehyde resin #1 | 16.5 |
| Mixed petroleum hydrocarbon solvents | 10.8 |
| Normal butyl alcohol | 2.4 |
| Titanium dioxide pigment | 57.0 |
| Silicone oil-polymerized ethylene gel | 10.5 |
| | 100.0 |

*Enamel*

| | Parts |
|---|---|
| Mill base A | 100.0 |
| Urea-formaldehyde resin #1 | 58.4 |
| Alkyd resin #2 | 78.4 |
| Normal butyl alcohol | 1.0 |
| Mixed petroleum hydrocarbon solvents | 4.0 |
| | 241.8 |

Alkyd resin #1 was a 55% solution of a soya bean oil modified alkyd resin in liquid hydrocarbon solvents.
Urea-formaldehyde resin #1 was a 60% solution of a butylated urea-formaldehyde resin in normal butyl alcohol.
Alkyd resin #2 was a 54% solution of a dehydrated castor oil modified alkyd resin in liquid hydrocarbon solvents.

Mill base A was ground for three days in a pebble mill and was discharged from the mill as a free flowing uniform dispersion. It was converted to a baking type white enamel by adding and mixing together other constituents in accordance with the above formula for the enamel. The concentration of polymerized ethylene was about 3.5% by weight based on the binder (nonvolatile organic film forming material). The concentration of silicone oil was 0.4% by weight based on the polymerized ethylene.

The enamel composition was thinned to spraying viscosity, sprayed on a smooth metal panel to provide a dry film thickness of about 1 mil and baked for 30 minutes at 280° F. The dry coating had high abrasion resistance and high gloss as shown in Table I.

EXAMPLE 2

A second enamel was prepared and sprayed on a metal panel in the same manner as in Example 1 using the same ingredients in the same proportions but omitting the silicone oil-polymerized ethylene gel in accordance with the following formula:

*Mill base B*

| | Parts |
|---|---|
| Alkyd resin #1 of Example 1 | 2.8 |
| Urea-formaldehyde resin #1 of Example 1 | 16.5 |
| Mixed petroleum hydrocarbon solvents | 10.8 |
| Normal butyl alcohol | 2.4 |
| Titanium dioxide pigment | 57.0 |
| | 89.5 |

This mill base was converted into an enamel according to the following formula:

*Enamel*

| | Parts |
|---|---|
| Mill base B | 89.5 |
| Urea-formaldehyde resin #1 of Example 1 | 58.4 |
| Alkyd resin #2 of Example 1 | 78.4 |
| Normal butyl alcohol | 1.0 |
| Mixed petroleum hydrocarbon solvents | 4.0 |
| | 231.3 |

The dry coating had a high gloss but low abrasion resistance as shown below in Table I.

EXAMPLE 3

A third enamel containing polymerized ethylene but no silicone oil was prepared and sprayed on a metal panel as described in Example 1. The ingredients of mill base A in the same proportions but without the silicone oil-polymerized ethylene gel were ground in a ball mill. A separate polymerized ethylene dispersion containing no silicone oil was prepared by mixing and heating the following ingredients at about 210° F. until a clear solution was produced and then cooling to form a gel:

*Polymerized ethylene gel*

| | Parts |
|---|---|
| Polymerized ethylene powder of Example 1 | 30 |
| Xylene | 70 |
| | 100 |

This gel was ground in a pebble mill for 7 days with normal butyl alcohol and alkyd resin in the following proportions to produce a polymerized ethylene dispersion:

*Polymerized ethylene dispersion*

| | Parts |
|---|---|
| Polymerized ethylene gel | 10.5 |
| Normal butyl alcohol | 1.0 |
| Alkyd resin #2 of Example 1 | 9.0 |
| | 20.5 |

The enamel containing polymerized ethylene but no silicone oil was prepared according to the following formula:

*Enamel*

| | Parts |
|---|---|
| Mill base B of Example 2 | 89.5 |
| Urea-formaldehyde resin #1 of Example 1 | 58.4 |
| Alkyd resin #2 of Example 1 | 69.4 |
| Polymerized ethylene dispersion | 20.5 |
| Mixed petroleum hydrocarbon solvents | 4.0 |
| | 241.8 |

The dry coating had a high abrasion resistance but low gloss as shown in Table I.

EXAMPLE 4

A fourth enamel containing polymerized ethylene but no silicone oil was sprayed on a metal panel as described in Example 1. The enamel was prepared by grinding for 3 days in a pebble mill the polymerized ethylene gel with the mill base according to the following formula:

*Mill base C*

| | Parts |
|---|---|
| Alkyd resin #1 of Example 1 | 2.8 |
| Urea-formaldehyde resin #1 of Example 1 | 16.5 |
| Mixed petroleum hydrocarbon solvent | 10.8 |
| Normal butyl alcohol | 2.4 |
| Titanium dioxide pigment | 57.0 |
| Polymerized ethylene gel of Example 3 | 10.5 |
| | 100.0 |

The mill base was converted to an enamel according to the following formula:

*Enamel*

| | Parts |
|---|---|
| Mill base C | 100.0 |
| Urea-formaldehyde resin #1 of Example 1 | 58.4 |
| Alkyd resin #2 of Example 1 | 78.4 |
| Normal butyl alcohol | 1.0 |
| Mixed petroleum hydrocarbon solvents | 4.0 |
| | 241.8 |

The dry coating had high abrasion resistance but low gloss as shown in Table I.

EXAMPLE 5

A fifth enamel containing both silicone oil and polymerized ethylene was prepared and sprayed on a metal panel as described in Example 1. This enamel differed from the enamel of Example 1 only by the method of incorporating these two constituents. In the present example a separate dispersion containing silicone oil and polymerized ethylene was prepared by ball milling the silicone oil-polymerized ethylene gel of Example 1 in normal butyl alcohol and an alkyd resin. This dispersion was then incorporated, by mixing, with a ground mill base, resin and solvent to produce a finished enamel. This method is the same as the method employed in Example 3.

The silicone oil-polymerized ethylene gel of Example 1 was ground in a pebble mill for 7 days with normal butyl alcohol and alkyd resin in the following proportions to produce a silicone oil-polymerized ethylene dispersion:

*Silicone oil-polymerized ethylene dispersion*

| | Parts |
|---|---|
| Silicone oil-polymerized ethylene gel of Example 1 | 10.5 |
| Normal butyl alcohol | 1.0 |
| Alkyd resin #2 of Example 1 | 9.0 |
| | 20.5 |

The enamel was prepared according to the following formula:

*Enamel*

| | Parts |
|---|---|
| Mill base B of Example 2 | 89.5 |
| Urea-formaldehyde resin #1 of Example 1 | 58.4 |
| Alkyd resin #2 of Example 1 | 69.4 |
| Silicone oil-polymerized ethylene dispersion | 20.5 |
| Mixed petroleum hydrocarbon solvents | 4.0 |
| | 241.8 |

The dry coating had a high abrasion resistance and was low in gloss as shown in Table I.

EXAMPLE 6

The sixth enamel containing both silicone oil and polymerized ethylene was prepared and sprayed on a metal panel as described in Example 1. This enamel differed from the products of Examples 1 and 5 only by the method of incorporating these two constituents. In the present example, a silicone oil solution and a polymerized ethylene gel were added separately to the mill base constituents, and the resulting composition (mill base D) was ground in a pebble mill for 3 days.

*Mill base D*

| | Parts |
|---|---|
| Alkyd resin #1 of Example 1 | 2.8 |
| Urea-formaldehyde resin #1 of Example 1 | 16.5 |
| Mixed petroleum hydrocarbon solvents | 9.8 |
| Normal butyl alcohol | 2.4 |
| Titanium dioxide pigment | 57.0 |
| 1% solution of polydimethyl siloxane in xylene | 1.0 |
| Polymerized ethylene gel of Example 3 | 10.5 |
| | 100.0 |

The enamel was prepared according to the following formula:

*Enamel*

| | Parts |
|---|---|
| Mill base D | 100.0 |
| Urea-formaldehyde resin #1 of Example 1 | 58.4 |
| Alkyd resin #2 of Example 1 | 78.4 |
| Normal butyl alcohol | 1.0 |
| Mixed petroleum hydrocarbon solvents | 4.0 |
| | 241.8 |

The dry coating had a high abrasion resistance but was significantly lower in gloss than Example 1 as shown in Table I.

EXAMPLE 7

A seventh enamel containing both silicone oil and polymerized ethylene was prepared and sprayed on a metal panel as described in Example 1. This enamel differed from the products of Examples 1, 5, and 6 only by the method of incorporating these two constituents. In the present example, the silicone oil solution was mixed into an otherwise finished enamel containing polymerized ethylene in accordance with the following formula:

*Enamel*

| | Parts |
|---|---|
| Enamel of Example 3 | 241.8 |
| Silicone oil solution of Example 1 | 1.0 |
| | 242.8 |

The dry coating had a high abrasion resistance but low gloss as shown in Table I.

The gloss of the seven products (Examples 1 to 7 inclusive) was measured at a 22° angle by the method described in "The Measurement of the Gloss of Paint Panels" by S. C. Horning and M. P. Morse published in the Official Digest of the Federation of Paint and Varnish Production Clubs, March 1947, p. 153. In this method, a higher value indicates higher gloss.

Abrasion resistance of the seven products (Examples 1 to 7 inclusive) was measured by mechanically rubbing the coated panel with a weighted ground glass rubbing tool in a back and forth motion over the same path. Abrasion resistance was recorded as the number of rubbing cycles required to wear through the film to the substrate.

The results of the gloss and abrasion resistance measurements on the enamels produced in Examples 1 to 7 are recorded below in Table I.

TABLE I

| Example No. | Gloss | Abrasion resistance | Remarks |
|---|---|---|---|
| 1 | 51 | 100,000 | Silicone oil-polymerized ethylene gel ground in mill base. |
| 2 | 55 | 6,000 | No silicone oil, no polymerized ethylene. |
| 3 | 16 | 100,000 | Polymerized ethylene dispersion added to enamel. |
| 4 | 28 | 100,000 | Polymerized ethylene gel ground in mill base. |
| 5 | 29 | 100,000 | Silicone oil-polymerized ethylene dispersion added separately. |
| 6 | 40 | 100,000 | Silicone oil solution and polymerized ethylene gel ground in mill base. |
| 7 | 16 | 100,000 | Silicone oil and polymerized ethylene dispersion added to enamel. |

The results recorded in Table I show that polymerized ethylene decreases the gloss of an enamel and that this gloss-depressing effect is practically eliminated by grinding a silicone oil-polymerized ethylene gel in the mill base from which the enamel is made. Table I further shows that the other methods of incorporating both the silicone oil and the polymerized ethylene do not provide the same improvement.

The following examples illustrate the improvements of this invention in other types of enamels and lacquers.

EXAMPLE 8

A white enamel containing both silicone oil and polymerized ethylene was prepared in accordance with the procedure outlined in Example 1 using the following formula:

*Mill base E*

| | Parts |
|---|---|
| Alkyd resin #1 of Example 1 | 2.8 |
| Urea-formaldehyde resin #1 of Example 1 | 16.5 |
| Mixed petroleum hydrocarbon solvents | 10.8 |
| Normal butyl alcohol | 2.4 |
| Titanium dioxide pigment | 57.0 |
| Silicone oil-polymerized ethylene gel of Example 1 | 10.5 |
| | 100.0 |

Mill base E was ground in a pebble mill for 3 days and was discharged from the mill as a free flowing uniform dispersion. It was converted to a baking type white enamel by adding and mixing together other constituents in accordance with the following formula:

*Enamel*

| | Parts |
|---|---|
| Mill base E | 100.0 |
| Alkyd resin #3 | 122.2 |
| Melamine formaldehyde resin #1 | 71.2 |
| Normal butyl alcohol | 1.5 |
| Mixed petroleum hydrocarbon solvents | 8.0 |
| | 302.9 |

Alkyd resin #3 was a 55% solution of a cocoanut oil modified resin in liquid hydrocarbon solvents.

Melamine formaldehyde resin #1 was a 60% solution of butylated melamine formaldehyde resin in normal butyl alcohol.

The concentration of polymerized ethylene was about 2.6% by weight based on the binder. The concentration of silicone oil was 0.4% by weight based on polymerized ethylene.

A dry coating of this enamel had a gloss of 68 which was equal to the gloss of the same enamel containing no silicone oil or polymerized ethylene. Another enamel containing no silicone oil but the same amount of polymerized ethylene added as a dispersion, as in Example 3, had a gloss of 25. The polymerized ethylene-containing enamels were equal in abrasion resistance, and superior in this respect to the enamel containing no polymerized ethylene.

EXAMPLE 9

A white enamel containing both silicone oil and polymerized ethylene with alkyd resin as the film former was prepared in the same manner as described in Example 1.

*Mill base F*

| | Parts |
|---|---|
| Alkyd resin #2 of Example 1 | 17.5 |
| Mixed petroleum hydrocarbon solvents | 13.5 |
| Titanium dioxide pigment | 58.1 |
| Silicone oil-polymerized ethylene gel of Example 1 | 10.9 |
| | 100.0 |

Mill base F was ground in a pebble mill for 3 days and was discharged from the mill as a free flowing uniform dispersion. It was converted to an air drying white enamel by adding and mixing together other constituents in accordance with the formula for the following enamel.

*Enamel*

| | Parts |
|---|---|
| Mill base F | 100.0 |
| Alkyd resin #4 | 154.3 |
| Manganese naphthenate drier solution | 0.3 |
| Mixed petroleum hydrocarbon solvents | 37.0 |
| | 291.6 |

Alkyd resin #4 was a 50% solution of a linseed oil/China-wood oil modified alkyd resin in liquid hydrocarbon solvents.

The concentration of polymerized ethylene was about 3.8% by weight based on the binder. The concentration of silicone oil was 0.4% by weight based on the polymerized ethylene.

This enamel, when sprayed on a metal panel as in Example 1, had a gloss of 66 compared with 68 for the same enamel containing no polymerized ethylene or silicone oil and 62 for the same enamel containing only polymerized ethylene, added as a dispersion. The dry polymerized ethylene-containing enamels were equal in abrasion resistance, and superior in this respect to the enamel containing no polymerized ethylene.

EXAMPLE 10

A white nitrocellulose/alkyd resin lacquer containing silicone oil and polymerized ethylene was prepared in accordance with the following formula:

*Mill base G*

| | Parts |
|---|---|
| Alkyd resin #5 | 11.8 |
| Normal butyl alcohol | 4.5 |
| Xylene | 10.9 |
| Titanium dioxide | 63.5 |
| Silicone oil-polymerized ethylene gel of Example 1 | 9.3 |
| | 100.0 |

*Lacquer*

| | Parts |
|---|---|
| Mill base G | 100 |
| Alkyd resin #5 | 70 |
| Lacquer solvents and diluents | 320 |
| 25% nitrocellulose solution | 200 |
| | 690 |

Alkyd resin #5 was a 60% solution of a castor oil modified alkyd resin in liquid hydrocarbon solvents.

The nitrocellulose solution was a 25% solution, in lacquer solvents and diluents, of nitrocellulose having a viscosity equivalent to ⅝″ as measured by Specification D–301–48, Consistency, Formula A of the American Society for Testing Materials.

The concentration of polymerized ethylene was about 2.8% by weight based on the binder. The concentration of silicone oil was 0.4% by weight of the polymerized ethylene.

The lacquer of this example, when sprayed on a metal panel and dried, had a gloss of 48 compared to 61 for the same lacquer containing no polymerized ethylene or silicone, and 29 for the same lacquer modified with polymerized ethylene alone, added as a dispersion. In this case, because of very low gloss and the difficulty of measuring differences by the 22° method previously described, the measurements were made at 60° by a similar method.

The lacquer of this example had abrasion resistance equal to the same lacquer modified with polymerized ethylene alone, and superior to the same lacquer containing no polymerized ethylene.

From the results of the examples it is seen that the inherent low gloss of enamels and lacquers which contain polymerized ethylene for abrasion resistance can be materially improved by separately incorporating silicone oil with the ethylene polymer and introducing the resulting composition into the enamel during the pigment grinding step. It has been shown that other methods of introducing silicone oil into a polymerized ethylene-containing formula do not produce an equivalent result.

In the examples a silicone oil-polymerized ethylene gel containing 30% by weight of polymerized ethylene is used. This concentration is not critical and can be varied over a wide range depending largely on the solvent power of the solvent used in preparing the gel. At a low polymerized ethylene concentration of the order of 5–10% the gel is likely to be in the form of a fluid slurry, at 20–40% a soft but rigid, friable gel, and at 50% and higher a rubbery solid. A concentration of 20–40% in a common solvent like xylene or toluene is preferred because the product is commercially practical to prepare and handle.

The concentration of silicone oil used in Examples 1, 8, 9 and 10 is 0.4% by weight of the polymerized ethylene. This can be varied from the order of 0.025% to 2.0% but the optimum effect has been found to occur within the range of 0.2–0.5%, which is the preferred concentration.

While the silicone oil-polymerized ethylene gel used in the examples is prepared from a hot solution in xylene, this solvent was chosen only for convenience. Other polymerized ethylene solvents which are normally used in enamels and lacquers may be substituted for the xylene. Also the gel composition need not be limited to silicone oil, polymerized ethylene and solvent since a similar gel can be made by dissolving the silicone oil and polymerized ethylene in other liquids, for instance a hot solution of an alkyd resin. The important thing is that the silicone oil and polymerized ethylene be dissolved together in a liquid medium which will produce a gel, which is subsequently ground with the other coating composition ingredients which require grinding.

The concentration of polymerized ethylene in the finished enamels and lacquers is shown in the examples to vary between 2.6% and 3.8% based on the binder (non-volatile organic film forming material). Commercially the most practical range is about 2.0% to 5.0%, which is the preferred range. While the concentration of polymerized ethylene can be reduced to the order of 0.1%, lower concentrations yield very little if any improvement in abrasion resistance. On the other hand, too high a concentration of polymerized ethylene adversely affects other essential physical properties of enamels and lacquers, such as hardness and general film integrity. A concentration of the order of 15.0% of polymerized ethylene has been found to be the maximum for a reasonable combination of film properties.

Although pebble mills or ball mills are used as the dispersion apparatus in the examples, the use of these particular mills is not critical, and the dispersion step may be carried out in any convenient type of dispersion equipment, such as roller, stone, or kneader mills, which will produce dispersions of finely divided pigment uniformly distributed throughout a liquid film forming vehicle.

Although only a portion of the total ingredients in the examples was subjected to milling, the proportion milled is not critical. While all of the silicone oil-polymerized ethylene gel must be milled in the presence of pigment, as described, the invention does not preclude the incorporation in the final product of other mill bases which have been milled in the absence of the gel. Also, the separate steps of preparing a mill base and converting it to an enamel are not essential, since all of the constituents of the final product may be milled together. However, this procedure is not normally efficient or commercially feasible.

The particular pigments, resins, and other enamel and lacquer ingredients used in the examples are not critical, and it will be obvious to those skilled in the art that other pigments, resins, plasticizers, driers, solvents, and other ingredients which are commonly used in enamels and lacquers may be substituted for those employed in the examples.

Examples of other pigments are carbon black, iron oxide, lead or zinc chromate, phthalocyanine pigments, and various organic dyestuffs and lakes thereof. Examples of other resins and film formers are oleoresinous varnishes, vinyl halide or vinyl ester resins, and acrylic resins such as butyl methacrylate.

The compositions of this invention may be applied to substrates other than metal, such as wood and previously coated surfaces. The method of application is not limited to spraying since the composition may also be applied by other conventional methods.

The products of this invention are coating compositions which possess a heretofore unknown combination of high abrasion resistance and good gloss. They are useful wherever the finish on an article is required to withstand repeated abrasion, such as the horizontal lid of a frozen food cabinet or a refrigerator shelf, and where little or no impairment of gloss can be tolerated to obtain abrasion resistance.

It is apparent that many widely different embodiments of this invention can be made without departing from the spirit and scope thereof and, therefore, it is not intended to be limited except as defined in the appended claims.

I claim:

1. In the process of preparing coating compositions the improvement which comprises preparing a gel containing 5% to 50% polymerized ethylene based on the weight of the gel, .025% to 2.0% of a liquid alkyl polysiloxane based on the weight of the polymerized ethylene, and a solvent for the polymerized ethylene and polysiloxane, and grinding said gel in the presence of pigment until a uniform dispersion is obtained; said polysiloxane being represented by the structural formula

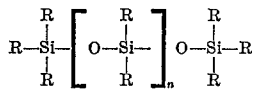

in which the various "R's" represent monovalent alkyl hydrocarbon radicals and "$n$" is a whole number greater than one; and said polymerized ethylene being solid at room temperature, having a structural formula characterized by recurrent —$CH_2$— groups, and showing a crystalline structure by X-ray diffraction.

2. The process of increasing the gloss of abrasion resistant enamels and lacquers containing polymerized ethylene which comprises preparing a gel containing 5% to 50% of polymerized ethylene based on the weight of the gel, .025% to 2.0% of a liquid alkyl polysiloxane based on the weight of the polymerized ethylene, and a solvent for the polymerized ethylene and polysiloxane, grinding said gel with pigment, non-volatile resinous organic polymeric film forming material, and volatile solvent until a uniform dispersion is obtained, and mixing the resulting dispersion with additional non-volatile resinous organic polymeric film forming material and additional solvent; said polysiloxane being represented by the structural formula

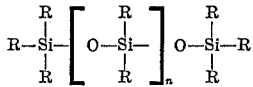

in which the various "R's" represent monovalent alkyl hydrocarbon radicals and "$n$" is a whole number greater than one; and said polymerized ethylene being solid at room temperature, having a structural formula characterized by recurrent —$CH_2$— groups, and showing a crystalline structure by X-ray diffraction.

3. The process of claim 2 in which the concentration of polymerized ethylene in the gel is between 20% and 40% by weight based on the total weight of the gel.

4. The process of claim 2 in which the polysiloxane is a polydimethyl siloxane having a viscosity between about 100 and 1000 centistokes at 25° C.

5. The process of claim 2 in which the concentration of polysiloxane in the gel is between 0.2% and 0.5% by weight based on the weight of the polymerized ethylene.

6. The product of the process of claim 2.

7. The process of increasing the gloss of abrasion resistant enamels and lacquers containing polymerized ethylene which comprises preparing a gel containing a liquid alkyl polysiloxane, polymerized ethylene and a solvent for the polysiloxane and polymerized ethylene, grinding said gel with pigment, non-volatile resinous organic polymeric film forming material, and a volatile solvent for said film forming material until a uniform dispersion is obtained, the concentration of said polymerized ethylene being between 0.1% and 15.0% by weight based on the weight of said film forming material and the concentration of the polysiloxane being between .025% and 2.0% based on the weight of the polymerized ethylene.

8. The process of increasing the gloss of abrasion-resistant enamels and lacquers containing polymerized ethylene which comprises preparing a gel containing a liquid alkyl polysiloxane, polymerized ethylene and a solvent for the polysiloxane and polymerized ethylene, grinding said gel with pigment, non-volatile resinous organic polymeric film forming material, and a solvent for said film forming material until a uniform dispersion is obtained, the concentration of said polymerized ethylene being between 2.0% and 5.0% by weight based on the weight of said film forming material, and the concentration of the polysiloxane being between 0.2% and 0.5% by weight based on the weight of the polymerized ethylene.

WILLIAM DENT LAWSON.

References Cited in the file of this patent

UNITED STATES PATENTS

| Number | Name | Date |
|---|---|---|
| 2,518,462 | Gowing et al. | Aug. 15, 1950 |
| 2,523,065 | Sage | Sept. 19, 1950 |

OTHER REFERENCES

Todd, "Silicones in Waxes and Polishes," address before Chem. Spec. Mfgrs. Assoc., Dec. 1950, reprinted from Soap and Sanitary Chemicals (special issue, Official proc., C. S. M. A.), vol. XXVI, No. C. S. M. A. (2), received in Patent Office, Mar. 13, 1951—4 pages.